United States Patent
Eloo et al.

(10) Patent No.: US 6,925,741 B2
(45) Date of Patent: Aug. 9, 2005

(54) SECTIONED ADJUSTABLE WATER FLOW GUIDE FOR PELLETIZER

(75) Inventors: Michael Eloo, Xanten (DE); Jürgen Veltel, Kevelaer (DE)

(73) Assignee: Gala Industries, Inc., Eagle Rock, VA (US)

( * ) Notice: Subject to any disclaimer, the term of this patent is extended or adjusted under 35 U.S.C. 154(b) by 165 days.

(21) Appl. No.: 10/282,095

(22) Filed: Oct. 29, 2002

(65) Prior Publication Data

US 2004/0081716 A1 Apr. 29, 2004

(51) Int. Cl.[7] .................................................. B29B 9/06
(52) U.S. Cl. .................. 42/67; 425/313; 425/DIG. 230
(58) Field of Search .......................... 425/67, 311, 319, 425/DIG. 230, 313, 315, 68

(56) References Cited

U.S. PATENT DOCUMENTS

| | | | | |
|---|---|---|---|---|
| 3,266,090 A | * | 8/1966 | Gosney | 425/67 |
| 4,021,176 A | * | 5/1977 | Dettmer et al. | 425/313 |
| 4,123,207 A | | 10/1978 | Dudley | 425/67 |
| 4,251,198 A | | 2/1981 | Altenburg | 425/67 |
| 4,300,877 A | | 11/1981 | Andersen | 425/67 |
| 4,621,996 A | | 11/1986 | Hundley, III | 425/190 |
| 4,728,276 A | | 3/1988 | Pauley et al. | 425/67 |
| 5,059,103 A | | 10/1991 | Bruckmann et al. | 425/67 |
| 5,110,523 A | * | 5/1992 | Guggiari | 264/40.5 |
| 6,551,087 B1 | * | 4/2003 | Martin | 425/67 |

* cited by examiner

Primary Examiner—Joseph S. Del Sole
(74) Attorney, Agent, or Firm—Jacobson Holman PLLC

(57) ABSTRACT

An adjustable sectioned water flow guide stationarily mounted in the water box of an underwater pelletizer to adjust the flow of pressurized water through the water box in order to accommodate a range of variable process requirements, such as pellet size, water flow, water temperature, melt flow, etc., while preventing pellet distortion and die hole freezing. The length and surface configuration of the water flow guide may be readily adapted through selection of an appropriate number of grooved or ungrooved sections to optimize fluid flow for particular pelletizer applications.

19 Claims, 5 Drawing Sheets

SECTIONED ADJUSTABLE WATER FLOW GUIDE FOR PELLETIZER

BACKGROUND OF THE INVENTION

1. Field of the Invention

The present invention generally relates to improvements in underwater pelletizers and more particularly to providing a sectioned adjustable water flow guide for the water box of an underwater pelletizer to more effectively adapt the conditions associated with the pressurized water flowing through the water box to the particular process requirements.

The present invention provides for adjustability of the one-piece water flow guide disclosed in application Ser. No. 09/400,287, filed Sep. 21, 1999, now U.S. Pat. No. 6,551,087, which is owned by the same assignee as the instant application. The flow guide in the aforesaid application is shown positioned in a typical Model 6 pelletizer of assignee. The subject matter of the aforesaid co-pending application is specifically incorporated in this application as if fully set forth herein.

2. Description of the Prior Art

Underwater pelletizers are well known and include a die plate with multiple orifices through which molten polymer strands are extruded with the orifices terminating at a die face on the die plate. A powered rotary cutter including a cutter hub mounted on a shaft with a plurality of blades supported from the cutter hub is associated with the die face for shearing the extruded polymer strands into pellets as the polymer is extruded beyond the die face. A water box encloses the die face, cutter hub and blades to form a cutting chamber through which water flows to quench and rigidify the extruded polymer strands, thus enabling the cutting blades to better shear the extruded strands into pellets. The flow of water through the cutting chamber defined by the water box also conveys a slurry of the water and sheared pellets through the outlet of the water box to a pellet dewaterer and/or a dryer. The above described underwater pelletizers are disclosed in related U.S. patents including U.S. Pat. Nos. 4,123,207, 4,251,198, 4,621,996, 4,728,276 and 5,059,103, all owned by the assignee of this invention.

While the above listed patents disclose various structures associated with underwater pelletizers, a need exists for adjustability in guiding the water flow through the water box in accordance with the particular process requirements of an extrusion and pelletizing application without the need for changing the water box design or for a new water flow guide.

SUMMARY OF THE INVENTION

Accordingly, it is an object of the present invention to provide a sectioned adjustable water flow guide positioned in the cutting chamber of an underwater pelletizer, with the sectioned water flow guide being adjustable to vary the volume of pressurized water flow into the water inlet, axially toward the die face and then with the sheared pellets away from the die face and to the outlet.

Another object of the present invention is to provide an adjustable water flow guide that optimizes pellet distribution and generates satisfactory head pressure against the pellets through water flow control.

A further object of the present invention is to provide a sectioned water flow guide stationarily positioned in the cutting chamber of an underwater pelletizer that can be adjusted to effectively vary the amount of cutting chamber space for successful pellet generation.

Still another object of the present invention is to provide a water flow guide that directs water to the seal area and, through circulation within the internal flow guide chamber, eliminates fines incoming thereto, pumping such fines immediately out of the seal area to prevent interference with the rotating shaft.

A still further object of the present invention is to provide a water flow guide made of multiple interchangeable sections which, through selection of the number and thickness of the sections used, can effectively accommodate a broad range of melt temperatures, pellet sizes, cutter speeds and water temperatures in the pelletizing operation.

Yet another object of this invention to be specifically enumerated herein is to provide a water flow guide in accordance with the preceding objects which will conform to conventional forms of manufacture, be of simple construction and easy to use so as to provide a device that will be economically feasible, long lasting and relatively trouble free in operation.

In accordance with these and other objects, the water flow guide of the present invention is sectioned and thus adjustable in length so that, when positioned within the cutting chamber defined by the water box of an underwater pelletizer, the flow of pressurized water passing through the water box can be changed in accordance with the adjusted size selected for the water flow guide. By selecting the appropriate flow guide sections the overall length of the flow guide can be selectively modified, and the amount and rate of water allowed to flow past the face of the die plate can be adjusted.

The water flow guide of this invention is stationarily mounted within the cutting chamber, preferably on the front of the pelletizer, and is oriented in the cutting chamber between the water inlet and the water and pellet slurry outlet of the water box, which are typically disposed in diametrically opposed relation, such as a water inlet at the bottom of the cutting chamber and the water and pellet slurry outlet at the top. The adjustability of the water flow guide can produce a range of pressurized water flows and effectively direct a specified volume of cooling water toward the die face and the polymer strands being extruded therefrom. By varying the distance between the cutting blades and the flow guide to direct and control the water flow to the die face, excessive cooling of the polymer and associated distortion of the pellets is prevented. The adjustable water flow guide of the present invention optimizes pellet distribution, improves the initial cooling effect of the pellets, and generates satisfactory head pressure against the pellets, allowing the flow of water across the face of the die plate to be optimized in accordance with the needs of specific pelletizing applications.

The water flow guide is in the form of a cylindrical tubular member affixed to the pelletizer in generally concentric relation to the rotating shaft of the pelletizer, preferably with the body of the guide filling out the majority of the cutting chamber volume. The free end of the guide's tubular member preferably terminates adjacent to the rotating cutter hub and cutting blades mounted thereon.

In a first embodiment of the invention, the water flow guide is a generally cylindrical tubular member with the external surface thereof being disposed adjacent to the generally cylindrical inner surface of the water box, preferably with a very small clearance therebetween. The tubular member includes a generally cylindrical axial bore which is positioned over and surrounds the rotating cutting hub shaft forming an annular space therebetween. Between the tubular member and the pelletizer, a variable number of annular sections can be positioned to adjust the overall length of the flow guide and thereby alter the flow volume passing over the face of the die plate for any particular application.

In a second embodiment of the invention, the water flow guide is made up of a plurality of sections which together form a generally cylindrical tubular member with an outer wall, again, preferably sized to be only slightly smaller than the inner wall of the water box to provide a very small clearance between the adjacent surfaces. Each section is machined to fit in close abutment with its adjacent section or sections and, when joined, the sections create a cylindrical outer surface that includes diametrically opposed, axially extending recesses, with one recess in alignment with the water inlet and the other recess in alignment with the slurry outlet of the water box. One end of each of the axial recesses is spaced between the ends of the cylindrical surface and in registry with the water inlet and slurry outlet, respectively. The other end of each of the axial recesses opens to a free end of the water flow guide which terminates facing the cutter hub and cutter blades. Sections of different thicknesses may be employed to adjust the overall length of the flow guide and the axial recesses. The axial recess portion of each section is properly machined to retain the continuity of the desired overall axial recess when the sections are adjoined.

In a third embodiment of the invention, the water flow guide again includes the generally tubular cylindrical member formed of sections as described in the second embodiment. In this embodiment, however, the cylindrical member is formed of a plurality of annular flat plates that are bolted together. Because there are no recesses machined therein, this embodiment has simplified manufacturing requirements, while still effectively providing a means for adjusting water flow through the cutting chamber.

In each embodiment of the invention, the adjustability of the flow guide enables a wider range of water temperatures, melt temperatures, flow rates and pellet sizes to be accommodated simply by selecting the desired flow guide components.

These together with other objects and advantages which will become subsequently apparent reside in the details of construction and operation as more fully hereinafter described and claimed, reference being had to the accompanying drawings forming a part hereof, wherein like numerals refer to like parts throughout.

DESCRIPTION OF THE PREFERRED EMBODIMENTS

Although several preferred embodiments of the invention are explained in detail, it is to be understood that the invention is not limited in its scope to the details of construction and arrangement of components of these specific embodiments. The invention is capable of other embodiments and of being practiced or carried out in various ways. Also, in describing the preferred embodiments, specific terminology will be resorted to for the sake of clarity. It is to be understood that each specific term includes all technical equivalents which operate in a similar manner to accomplish a similar purpose.

Figure 1:
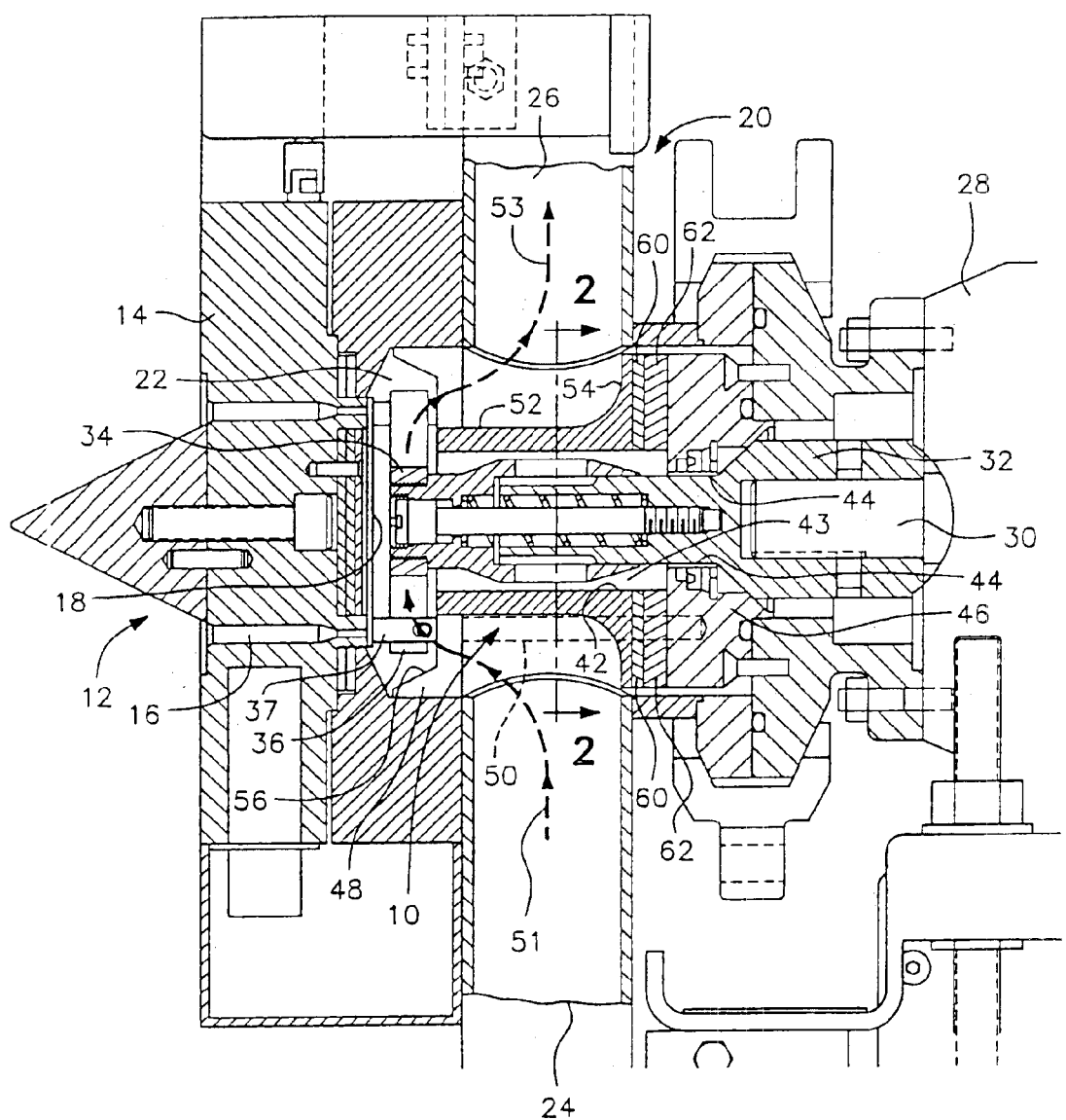
FIG. 1 is a vertical, longitudinal sectional view of an underwater pelletizer having one embodiment of a water flow guide with annular sections positioned therein in accordance with the present invention, and illustrating the water flow path through the cutting chamber.
Figure 2:
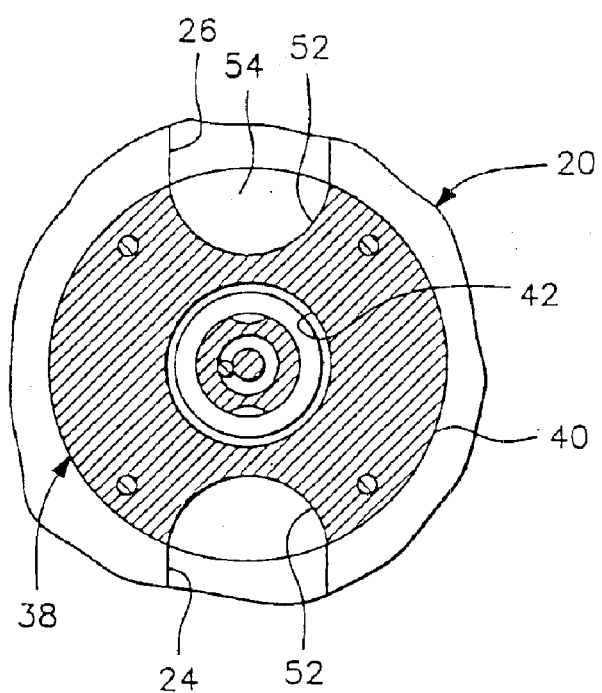
FIG. 2 is a transverse, vertical sectional view along section line 2—2 in FIG. 1 illustrating the association of the water flow guide to the water box, pelletizer drive shaft, cutter hub, water inlet and water and slurry outlet.
Figure 3:
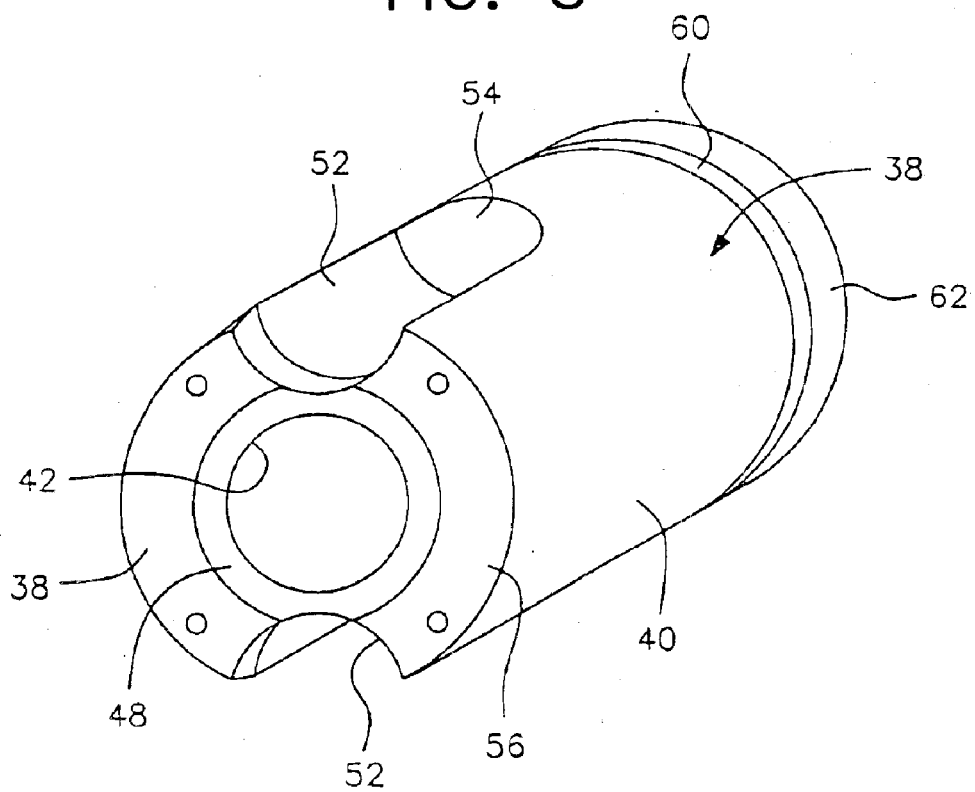
FIG. 3 is a perspective view of the water flow guide with annular sections shown in FIGS. 1 and 2 looking at the end adjacent the die plate, cutter hub and cutter blades.

FIGS. 1–3 illustrate a water flow guide, generally designated by reference numeral 10, associated with an underwater pelletizer, generally designated by reference numeral 12. The underwater pelletizer 12, such as that disclosed in U.S. Pat. No. 5,059,103, is a typical Model 7 pelletizer manufactured by the assignee of this application. The pelletizer 12 is schematically illustrated and includes a die plate 14 having a plurality of die orifices 16 therein through which molten polymer is extruded into strands which pass through a die face 18 on the inner surface of the die plate 14. The die plate 14 is connected to a pelletizer water box, generally designated by reference numeral 20, which includes a cutting chamber 22 and also includes a pressurized water inlet 24 and a diametrically opposed outlet 26 for discharge of a slurry of water and pellets from the cutting chamber 22 for conveyance out of the water box 20 to a pellet dewaterer and/or a pellet dryer (not shown). The pelletizer 12 includes a motor 28 with an output shaft 30 drivingly connected to a cutter hub shaft 32 having a cutter hub 34 mounted thereon. The cutter hub 34 includes a plurality of radially extending support arms 36 which support replaceable cutter blades 37 which coact with the die face 18 to shear the extruded strands of polymer into pellets. Except for the water flow guide 10 of the present invention, the structure of the underwater pelletizer may correspond generally with that disclosed in U.S. Pat. No. 5,059,103 or any other known configuration and design.

The typical underwater pelletizer utilizes water to cool and rigidify the strands of polymer as they are discharged from the die face, with the spacing of the cutter blades and the rotational speed of the cutter hub determining the size of pellets sheared from the extruded polymer strands. Water flowing in through the water inlet not only cools and rigidifies the polymer strands but also conveys the sheared pellets as a slurry from the cutting chamber into the outlet.

As shown by the arrows 51 and 53 in FIG. 1, the water flow guide 10 of the present invention guides the inlet water from inlet 24 toward the die plate 14 so that it moves along the surface of the die face 18 and over and around the rotating cutter hub 34 and cutter blades 37. By adjusting the cutting chamber space and selectively directing this water flow, the extruded strands of polymer may be more efficiently quenched, thereby more effectively cooling and rigidifying the polymer strands. By adjusting the size of the flow guide and thus the water flow space inside the cutting chamber, the flow of too much water across the die face can be prevented, thereby reducing pellet distortion and die hole freezing. As a result, the rotating cutter blades 37 more effectively shear the extruded strands to form pellets by making a substantially straight diametric cut through the polymer strands. The water flow guide 10 also provides more effective entrainment of the pellets in the water and more effective conveyance of the water and pellet slurry through the flow path for discharge through outlet 26 from the water box 20 for subsequent dewatering and drying.

The water flow guide illustrated in FIGS. 1–3 includes a generally cylindrical tubular member, generally designated by the reference numeral 38, having an outer surface 40 and a cylindrical axial bore 42 which is substantially concentric with and closely surrounds the drive shaft 32 as illustrated in FIG. 1, thus forming an annular space 43. Interchangeable annular sections 60, 62 are mounted to the pelletizer end of the cylindrical tubular member 38 which is furthest from the die plate. An outermost section 62 abuts and is secured against the seal holding plate 46 to which the flow guide is mounted. The seal holding plate 46 is provided with an annular rubber-type seal 44 which prevents inflow of the water circulating in the annular space 43 between the axial bore 42 and drive shaft 32.

The number of annular sections 60, 62, may be varied, as may the thickness of each section, to allow the overall length of the flow guide to be adjusted, thereby providing a means for increasing or decreasing the flow of water across the face of the die plate. When too much water flows across the die face, the pellets can become distorted and the die holes can freeze over. Through the addition of various numbers of annular sections, e.g., one, two, three, etc., as well as the use of sections having different thicknesses, the water flow is increased or decreased according to specific application requirements. Because the annular sections may be readily manufactured out of stainless steel, the resulting flow guide also demonstrates reduced deterioration arising from pellet wear in the flow inlet and outlet, extending the useful life of the flow guide.

The free end 48 of the cylindrical member 38, nearest the die face, is flat with a tapered or beveled edge 56 around its periphery. The free end 48 terminates adjacent the cutter blades 37 on the cutter hub 34. A plurality of longitudinally extending through-bolts 50 are countersunk into the flat surface 48 of the tubular member 38 and extend therethrough and through the annular sections 60, 62 to screw thread into the seal holding plate 46 of the pelletizer structure. Bolts of different lengths may be employed depending upon the number of annular sections inserted between the flow guide and the pelletizer. In this way, the tubular cylindrical member 38 with the annular sections 60, 62 is rigidly affixed to the pelletizer and is oriented in concentric relation to the cutter hub shaft 32, with the external surface 40 adjacent the interior surface of the cutting chamber 22.

The external surface 40 of the cylindrical member 38 includes diametrically opposed longitudinally extending grooves or recesses 52 which are arcuate in transverse configuration. The grooves or recesses 52 are in alignment with the diametrically opposed water inlet 24 and slurry outlet 26, respectively. The inner end of each recess 52 is preferably arcuately curved at 54 so that the outer edge of the upwardly curved inner end coincides with the interior surface of the aligned edge of each the water inlet 24 and the slurry outlet 26, respectively. The outer end of each recess terminates at the free outer end 48 and beveled edge surface 56 which faces the rotational path of the cutter blades 37, as illustrated in FIGS. 1 and 3. Other recess formation and passageway designs may be machined into the various sections, such as those shown and described in aforesaid U.S. patent application Ser. No. 09/400,287, now U.S. Pat. No. 6,551,087.

Preferably, the external surface 40 of the guide is closely adjacent or engaging the internal surface of the cutting chamber 22 and the flat surface 48 is closely adjacent the cutter hub 34 and cutter blades 37 with sufficient clearance not to interfere with their rotation. Thus, except for the selectively designated water flow paths defined by recesses 52, and the space around the die plate 18, cutter hub 34 and cutter blades 37, the guide 10 preferably fills the whole cutting chamber 22. As illustrated in FIG. 2, the close fitting relationship of the water flow guide 10 in relation to the water box 20 and cutting chamber 22 assures that incoming pressurized water will engage the axial recess 52 in alignment with the water inlet 24, causing the water to move axially toward the die face 18, the cutter hub 34, cutter hub arms 36 and cutter blades 37, and then transversely across the die face 18 and around the cutter hub assembly. Through selection of the appropriate number and thickness of additional annular sections, the transverse flow of water across the die face 18 may be optimized for any given pelletizing application and pellet size. The design of the water flow guide also facilitates water flow through the annular space or chamber 43, moving incoming fines out of the area adjacent the seal 44, to prevent such fines from packing into the annular space 43 around the shaft 32.

Figure 4B:
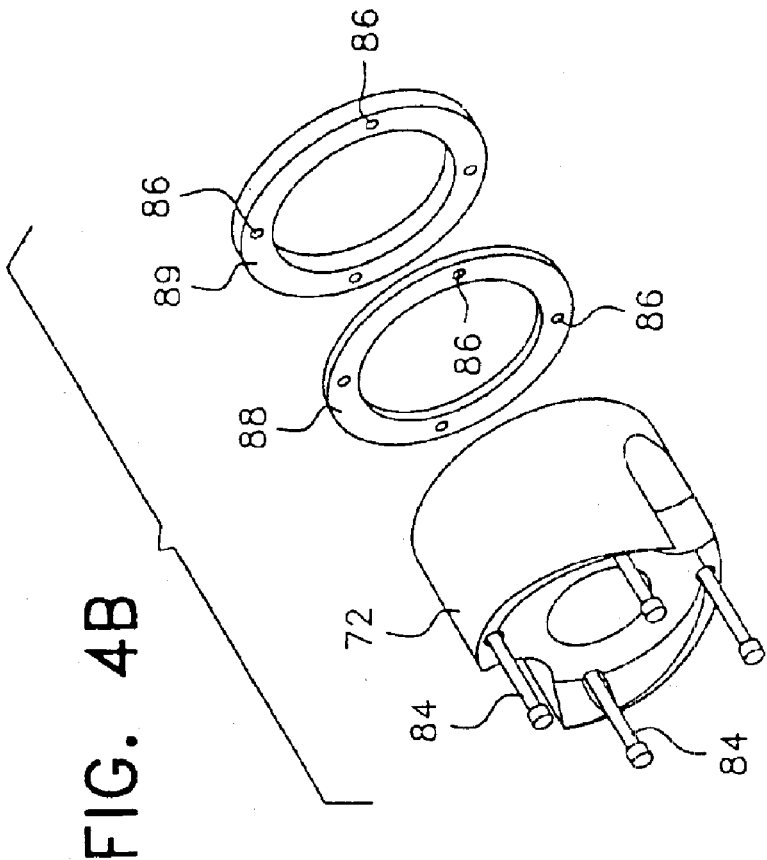
FIG. 4B is an exploded view of the annular sections and variant water flow guide shown in FIG. 4A.
Figure 4A:
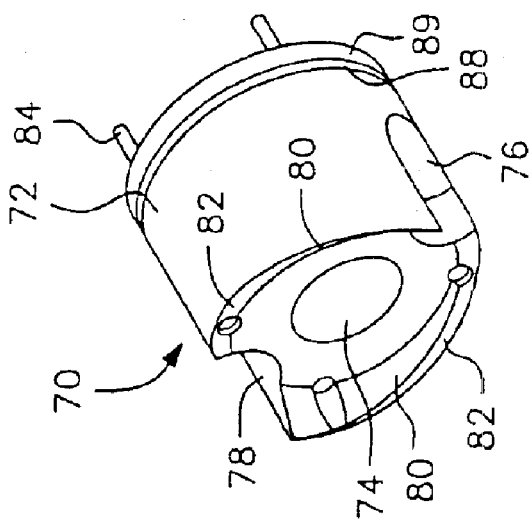
FIG. 4A is a perspective view of a variant of the water flow guide with annular sections of FIGS. 1–3.

FIGS. 4A and 4B illustrate a variant of the water flow guide shown in FIGS. 1–3, generally designated by the reference numeral 70. Flow guide 70 includes tubular member 72 having an internal axial bore 74, an external axial recess 76 for alignment with pressurized water inlet and a diametrically opposed external axial recess 78 for alignment with a water and pellet slurry outlet. The free end of the water flow guide 70 is provided with opposing beveled or sloped edge surfaces 80, and a tapering sloped relief 82 is provided on each edge surface 80 in opposing angular directions on the free end of the water flow guide, to facilitate water flow. As with the embodiment shown in FIG. 1, through-bolts 84 pass through apertures in the tubular member 72 and apertures 86 in the annular sections 88, 89 to mount the flow guide to the pelletizer in substantially the same position in the water box.

Figure 5B:
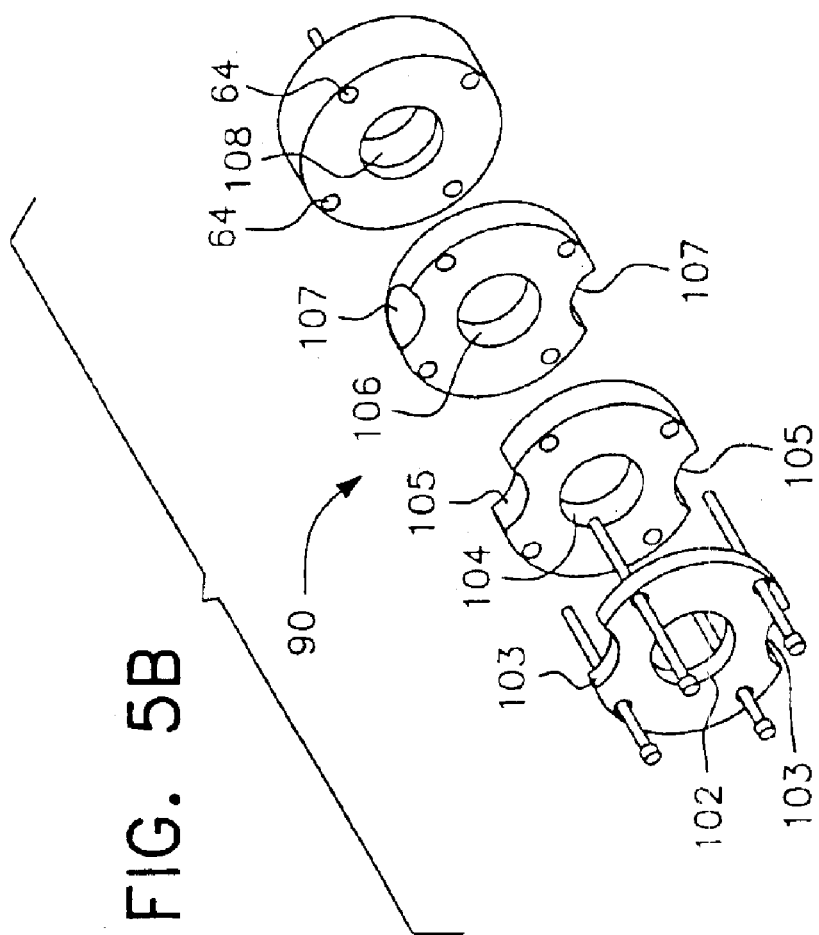
FIG. 5B is an exploded view of the multiple section water flow guide shown in FIG. 5A.
Figure 5A:
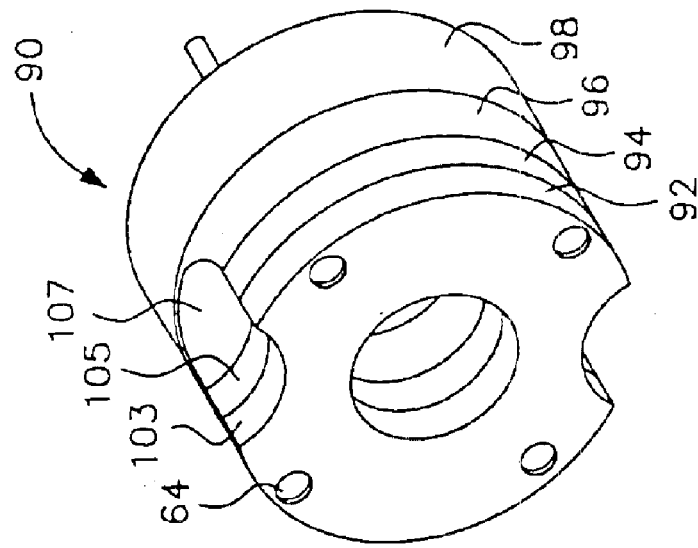
FIG. 5A is a second embodiment of a flow guide in accordance with the present invention, the flow guide formed of multiple adjoining sections.

FIGS. 5A and 5B illustrate a second embodiment of the water flow guide, generally designated by the reference numeral 90, which includes a plurality of sectioned pieces 92, 94, 96, 98 which are bolted together to form a tubular member as illustrated in FIG. 5A. The rearwardmost section 98 is generally cylindrical without cutouts in its outer surface. The next adjacent section 96 has a generally spherical section cutout 107 to define the back end of axial grooves 110 which correspond to surface 54 and axial grooves 52, respectively, in the first embodiment. The two front sectioned pieces 92, 94 have circular cutout openings 102, 104, respectively, which, when the sectioned pieces are bolted together, mate with cutout 107 to form the axial grooves 110, as in the first embodiment.

As can be seen in FIGS. 5A and 5B, each of sectioned pieces 92, 94, 96 includes a pair of axial recesses 103, 105, 107, respectively, the recesses of each pair being in opposing relationship. In the embodiment shown, axial recesses 103, 105 are substantially equal in size and shape, while axial recesses 107 are arcuately curved (spherical section shaped) so that the outer edge of the upwardly curved inner end coincides with the interior surface of the aligned edge of each of the water inlet 24 and the slurry outlet 26, respectively. Alternatively, each of sectioned pieces 92, 94, 96 could include only one recess, or the sectioned pieces could be manufactured without any recesses.

Figure 6:
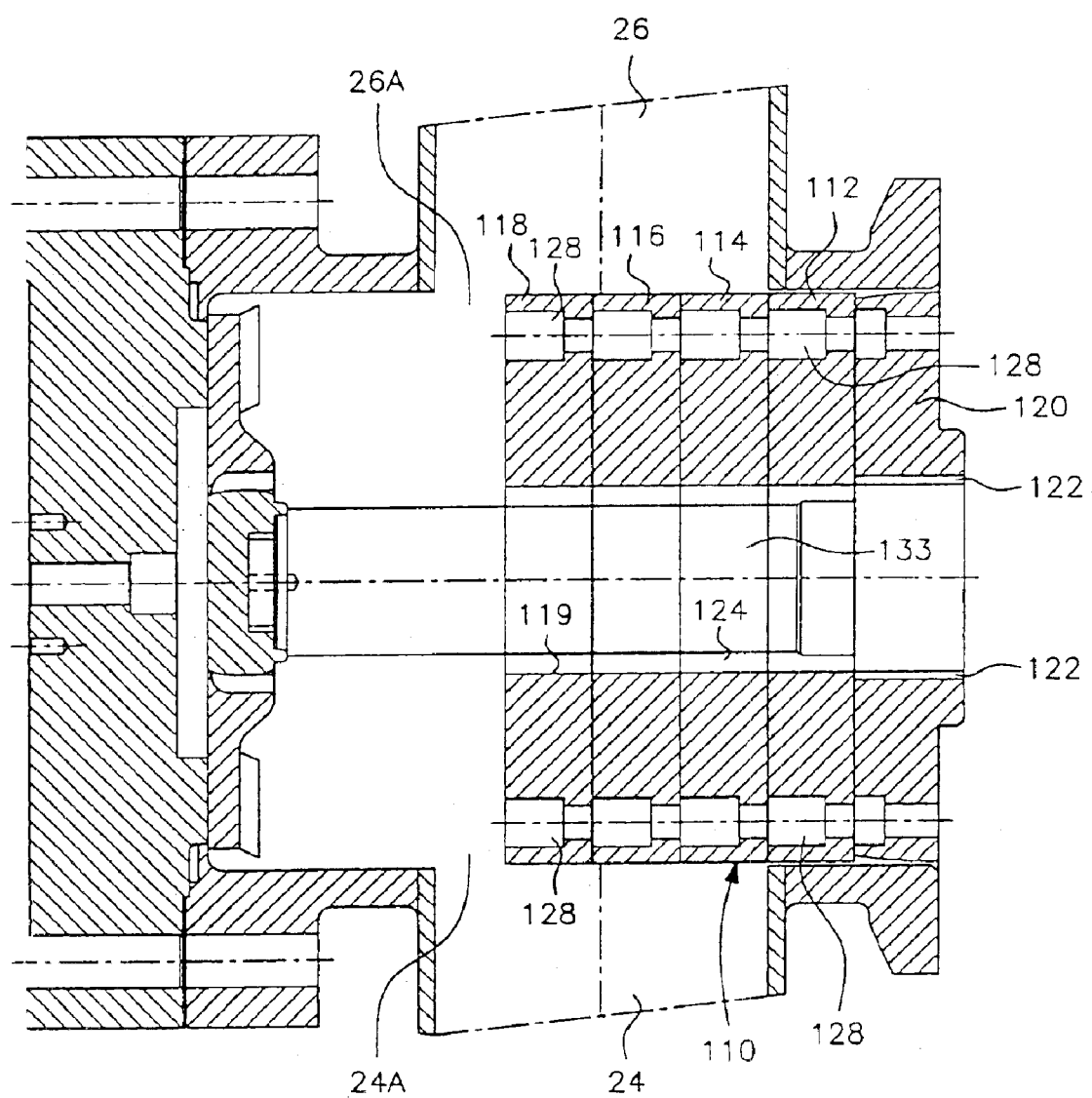
FIG. 6 is a vertical longitudinal sectional view of an underwater pelletizer having a third embodiment of an adjustable water flow guide mounted in accordance with the present invention.

FIG. 6 depicts a cross-sectional view of a third embodiment of a water flow guide in accordance with the present invention, generally designated by the reference numeral 110, as mounted to an underwater pelletizer. As with the second embodiment, the flow guide 110 is comprised of a plurality of pieces, here annular flat plates 112, 114, 116, 118 that include generally oval openings 128 through which bolts may be inserted to secure the plates to each other and to the seal holding plate 120. The plates can be machined with inlet and outlet grooves on their outermost surfaces to direct the water flow or, as shown in FIG. 6, can be made without grooves.

A holding plate seal 122 fits into a groove on the surface of the seal holding plate 120 to prevent entry of the water circulating within the annular space 124. Flow of water through the annular space 124 acts to move incoming fines immediately out of the seal area, preventing the accumulation of such fines around the shaft 33 which might otherwise interfere with the seal 122 and shaft 33 rotating therein. The nature and density of the fines define the final configuration of the flow guide and the desired spacing between axial bore wall 119 of the flow guide 110 and the pelletizer shaft 33.

Varying numbers of plates may be included to adjust the overall length of the resulting flow guide. As can be seen, each additional plate narrows the inflow channel 24A for water flowing from the inlet 24 and the outflow channel 26A through which the slurry is directed, as well as the overall cutting chamber space. Varying the number of plates also enables the distance between the cutter hub holder and blades and the flow guide to be adjusted in order to optimize pellet distribution, improve the initial cooling effect of the water on the pellets and generate satisfactory head pressure against the pellets leaving the die holes.

With the present invention it is possible, with a single system and a single flow guide component, to fine tune the physics of the internal flow guide to best accommodate a range of process requirements. For example, water flow and temperature, as well as mass flow and melt temperature, may be adjusted cooperatively and over a wider range than is possible with prior designs. Conditions may be optimized for pellets of different sizes, with the present invention being able to produce larger pellets while distributing and chilling such pellets effectively. A wider range of cutter speeds and pelletizer blade adjustments may also be accommodated.

Through the sectioned adjustment capability provided by the present invention, the adjustable flow guide greatly reduces the need for different water box designs in order to alter inlet and outlet flow configuration. The adjustable flow guide now provides a means of customization of water flow while using the same water box. Different effects may also be obtained with the same cutter hub design through adjustment in the flow guide.

Finally, the present invention enables head pressure, which is the result of the design of the pelletizing system after the pellets are introduced into the water flow, to be adjusted across a broader range. The adjustable water flow guide enables important parameters including pipe dimension and length, height, extra pressure valve and water flow, also to be adjusted easily and efficiently.

The foregoing is considered as illustrative only of the principles of the invention. Further, since numerous modifications and changes will readily occur to those skilled in the art, it is not desired to limit the invention to the exact construction and operation shown and described, and, accordingly, all suitable modifications and equivalents may be resorted to, falling within the scope of the invention.

What is claimed is:

1. In an underwater pelletizer having a rotating shaft for cutting extruded polymer pellets against a die face, the improvement of an adjustable flow guide for pressurized water in a cutting chamber comprising:

a generally cylindrical body having a longitudinal bore surrounding said rotating shaft and one or more cut-outs on an outer surface to direct said pressurized water toward and away from said die face; and at least one annular section coupled to said cylindrical body and having an outer surface that is generally coincident with said outer surface of said body, said annular section adjusting an overall length of said flow guide and subsequent flow of water across said die face.

2. An adjustable flow guide for pressurized water in a cutting chamber of an underwater pelletizer having a rotating shaft for cutting extruded polymer pellets against a die face, said flow guide comprising a plurality of annular sections having substantially equivalent outer circumferences, each section machined to fit in abutment against an adjoining annular section with said outer circumferences generally coincident with one another to together form a generally cylindrical body having a longitudinal bore surrounding said rotating shaft, a number of said plurality of annular sections being selectable to determine an overall length of said flow guide body, changes in said length altering water flow passing by said die face.

3. The adjustable flow guide as set forth in claim 2, wherein at least some of said annular sections include at least one cut-out on an outer surface to define an axial groove in said guide to direct said pressurized water toward and away from said die face.

4. The adjustable flow guide as defined in claim 3, wherein adjoining cutouts form a pair of axial grooves, one adapted to be positioned in alignment with an inlet to said cutting chamber and the other adapted to be positioned in alignment with an outlet of said cutting chamber.

5. The adjustable flow guide as defined in claim 4, wherein one of said cutouts includes an arcuately curved inner end for changing radial flow of water into the cutting chamber to axial flow and axial flow of the water and pellet slurry into radial flow.

6. The adjustable flow guide as set forth in claim 2, wherein said plurality of annular sections include a plurality of flat plates.

7. A pelletizer comprising a die plate with extrusion orifices terminating in a die face, a driven rotary cutter blade hub supported in opposed relation to said die face, at least one cutter blade mounted on said blade hub and capable of moving in a plane generally parallel to and closely adjacent said die face to cut strands of material extruded through said orifices into pellets, a water box having a cutting chamber enclosing said die face, cutter blade hub and cutter blade, said water box including a water inlet and an outlet for discharge of water and pellets entrained in the water, and an adjustable water flow guide formed as a stationary tubular member adapted to be positioned in said water box and having a free end adapted to be closely spaced from said cutter blade hub and blade, said tubular member including at least one interchangeable annular section for adjusting an overall length of said tubular member.

8. The pelletizer as defined in claim 7, wherein said adjustable water flow guide includes a plurality of interchangeable annular sections coupled to an end of the flow guide furthest from said die plate.

9. The pelletizer as defined in claim 8, wherein said plurality of interchangeable annular sections include annular sections of different thicknesses.

10. The pelletizer as defined in claim 7, wherein said tubular member includes an external surface adapted to be oriented closely adjacent an interior surface of the water box, said external surface having at least one axial recess providing an axial water flow passageway.

11. In combination, an underwater pelletizer and an adjustable water flow guide comprising:

an underwater pelletizer having a die plate with extrusion orifices terminating in a die face, a driven rotary cutter blade hub supported in opposed relation to said die face cutter blades mounted on said blade hub and capable of moving in a plane generally parallel to and closely adjacent said die face to cut strands of material extruded through said orifices into pellets, and a water box enclosing said die face, cutter blade hub and cutter blades, said water box including a pressurized water inlet and an outlet for discharge of a slurry of water and pellets entrained in the water; and an adjustable water flow guide positioned in said water box and capable of directing pressurized water entering the water inlet toward the die face and cutter blades and capable of directing discharge of water and pellets toward said outlet, said water flow guide including a plurality of interchangeable annular sections having generally equivalent outer circumferences, each section cooperatively abutting against an adjoining section with said circumferences being generally coincident with one another, and a number said sections being selectable to vary an overall length of said water flow guide.

12. The combination as defined in claim 11, wherein said water flow guide is stationary within said water box.

13. The combination as defined in claim 11, wherein said plurality of sections coupled together forms a tubular member having an outer surface, at least one of said sections having an outer axial recess therein to provide an axial flow path on said outer surface.

14. The combination as defined in claim 11, wherein said plurality of sections coupled together forms a tubular member having an external surface generally in concentric close fitting relation to an interior surface of the water box, at least one of said sections having a pair of outer axial recesses therein to provide axial flow paths on said external surface of said tubular member, a first one of said axial recesses being in alignment with the water box inlet and a second one of said axial recesses being in alignment with the water box outlet.

15. The combination as defined in claim 14, wherein said recesses are oriented in diametrically opposed relation, each forming an axial groove parallel to the rotational axis of the cutter blade hub.

16. The combination as defined in claim 15, wherein each of said axial grooves is formed by adjoining the outer axial recesses of at least two of said sections.

17. The pelletizer as defined in claim 7, wherein said adjustable water flow guide includes a plurality of interchangeable annular sections coupled to an end of the flow guide closest to said die plate.

18. The combination as defined in claim 12, wherein said interchangeable annular sections are coupled to an end of the flow guide closest to said die plate.

19. The combination as defined in claim 12, wherein said interchangeable annular sections are coupled to an end of the flow guide furthest from said die plate.

* * * * *